Dec. 27, 1932.    A. F. HICKMAN    1,892,305
VEHICLE SPRING AND SHOCK ABSORBER SUSPENSION
Filed Nov. 24, 1930    4 Sheets-Sheet 2

Inventor
Albert F. Hickman
By Popp & Powers
Attorneys

Dec. 27, 1932. A. F. HICKMAN 1,892,305
VEHICLE SPRING AND SHOCK ABSORBER SUSPENSION
Filed Nov. 24, 1930  4 Sheets-Sheet 3

Inventor
Albert F. Hickman
By Popp & Powers
Attorneys

Patented Dec. 27, 1932

1,892,305

UNITED STATES PATENT OFFICE

ALBERT F. HICKMAN, OF EDEN, NEW YORK, ASSIGNOR TO HICKMAN PNEUMATIC SEAT CO., INC., OF EDEN, NEW YORK, A CORPORATION OF NEW YORK

VEHICLE SPRING AND SHOCK ABSORBER SUSPENSION

Application filed November 24, 1930. Serial No. 497,653.

This invention relates to a combined spring and shock absorber for vehicles, and more particularly to a non-side sway, spring suspension, whose resistance is of a sinusoidal nature, i. e. with a large spring flexure for small, initial increases in imposed pressure, but with rapidly decreasing increments in spring flexure for greater increases in imposed pressure.

The principal object of the invention is to produce a simple, rugged and durable spring suspension which will have inherent shock absorber qualities as to both the up and the down spring flexures, and will softly cushion the roadway irregularities and also prevent side sway of the vehicle, irrespective of whether said vehicle is travelling unloaded or with a full capacity load, and without the need of any adjustment to compensate for such variable loads. Numerous other objects of the invention and practical solutions thereof are described in detail in the herein patent specification, wherein:—

In the accompanying drawings.

In the following description similar characters of reference indicate like parts in the several figures of the drawings.

My invention may be embodied in various forms and in vehicle spring and shock absorber suspensions of different constructions and the present applications are therefore to be regarded merely as some of the possible organizations which come within the scope of my invention and satisfactorily carry out the function of the same in practice.

As here shown, and referring for the present to only Figs. 1–6, the same is constructed as follows:—

The numerals 20a and 20b represent the longitudinal side frame bars of a typical automobile or other vehicle chassis, the same being secured laterally to each other at various points, for instance by the rear, transverse frame tie-bar 21. Secured by bolts 22 and 23 or otherwise to said side frame bars 20a and 20b are a pair of bracket hangers 24a and 24b which are suitably webbed and braced and are provided at their lower ends with bearings 25a and 25b respectively. Arranged with its opposite ends in said journals is a horizontal, transverse rock shaft 26 to which is symmetrically secured a pair of rock levers 27—27 which, in the position and arrangement shown in Fig. 1, extend longitudinally and approximately horizontally forward from said rock shaft 26.

Figure 2:
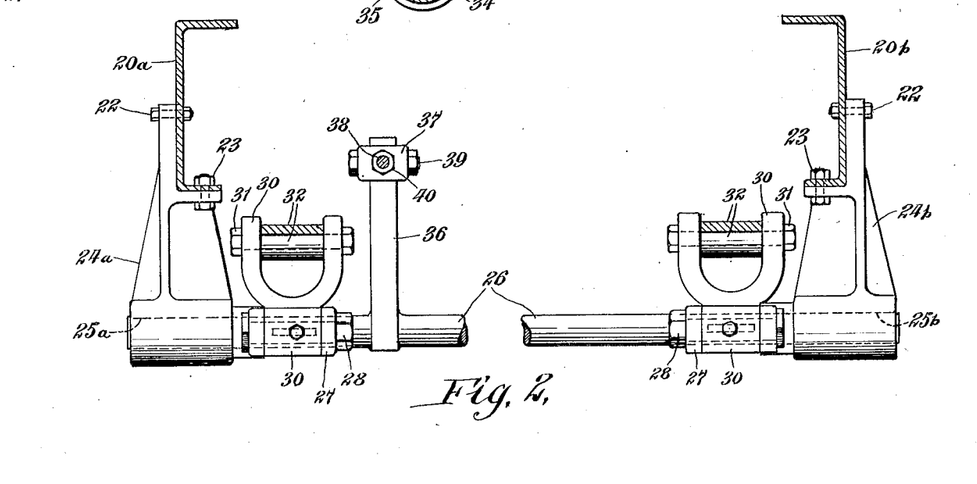
Figure 2 is an enlarged, fragmentary, vertical, transverse section thereof taken on line 2—2, Fig. 1.

Each of said rock levers 27 has pivotally connected thereto (upon a pivot bolt or crank pivot 28 or otherwise) the one end of a link 30. The other end of said link is preferably bifurcated as shown in Fig. 2 and is pivotally connected by a pivot bolt 31 to the curled rear end of a companion semi-elliptic or other main vehicle spring or main movable member 32. The extreme front end of said main spring is pivotally connected at 33 to the companion side frame bar 20a or 20b of the vehicle chassis. Intermediately of the ends of said main spring, the same is secured by U-bolts 34 or otherwise to the axle housing or axle 35, upon the opposite ends of which are journaled the usual vehicle wheels.

Secured by welding or otherwise to the rock shaft 26 is a rock arm 36 to the outer end of which is pivoted, at 39, a yoke 37.

Threaded at its rear end into said yoke 37 is an adjustment rod 38, the latter being suitably locked in an adjusted position by a lock nut 40. The front end of said adjustment rod 38 is secured to the rear end of a helical secondary spring 41, the front end of which is pivotally connected at 42 to the vehicle chassis frame.

Figure 1:
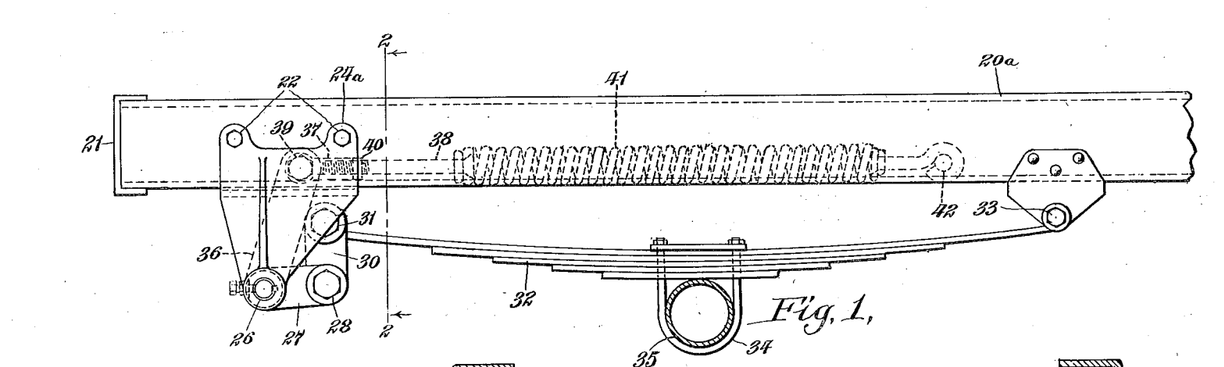
Figure 1 is a fragmentary side elevation of an automobile chassis showing a rear spring and shock absorber suspension constructed in accordance with my invention.
Figure 4:
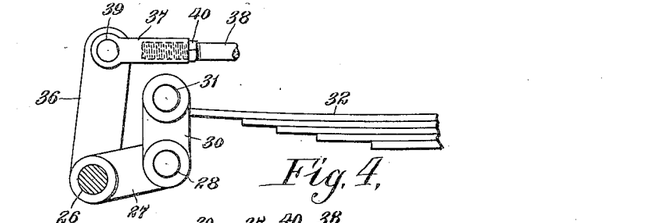

Figs. 1, 2 and 4 illustrate the position of the various parts when the vehicle is normally and statically loaded. In this position, the leverage of the rock lever 27 is substantially maximum and the secondary spring 41 is resisting upward movement of the main spring 32 to an approximately minimum extent as far as the position of said rock lever is concerned.

If now the vehicle axle 35 be moved upwardly, the rear pivot 31 of said spring will also, at first, be moved a considerable distance upwardly against the tension of the secondary spring 41. During this movement, however, the main spring 32 will be flexed very little. A relatively slight increase in upward pressure of the axle 35 is sufficient to considerably stretch the secondary spring 41 (and to simultaneously allow of a considerable upward movement of the rear pivot 31 of the main spring) but such a small increase in upward axle pressure is too small to more than slightly flex the main spring 32. This is due to the fact that the leverage exerted by the main spring 32 is approximately constant, and, as it must be so constructed as to be able to withstand extremely heavy loads and violent and heavy impact, it must necessarily be made very stiff. Such a condition of affairs does not exist as to the secondary spring 41 because the total effective leverage, which it exerts varies from a maximum amount as in Figs. 1, 2 and 4 to an effective lever arm of almost zero as for instance in Fig. 3.

Figure 3:
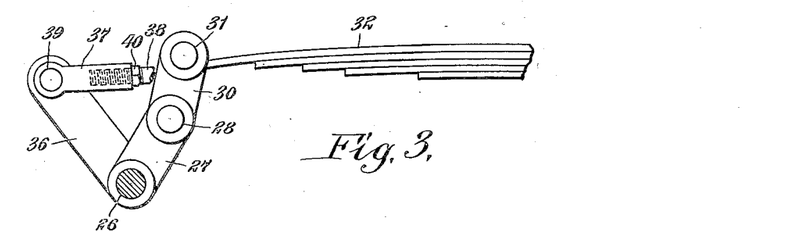
Figures 3-6 are diagrammatic, fragmentary side elevations of the spring and shock absorber construction of Figs. 1 and 2, illustrating successive positions of the moving parts thereof.

In this Fig. 3 it should be noticed that the two pivot centers 28 and 31 of each link 30 lie in substantially the same straight line with the fulcrum of the rock lever 27 (i. e. the axis of the rock shaft 26). In other words the whole construction is such that the line of force imposed upon the crank pivot 28 is able to pass through the axis of the rock shaft 26, and in Fig. 3 is shown as substantially doing so. If said crank pivot 28 were to actually move into the same straight line with the axis of the rock shaft 26 and the pivot center 31, then the leverage exerted by the main spring 32 in an effort to rotate said rock shaft 26 would be equal to zero, and the resilient opposition to such a movement by the secondary spring 41 under such conditions would be equal to infinity. Theoretically all of these three points could lie in one straight line but in actual practice the effective leverage of the parts is so small that such a condition rarely actually occurs, though it is approached more or less closely when the vehicle is travelling with a very heavy load at high speed over a very rough road. However, when it does occur and furthermore even if the parts should move beyond this dead center position, no locking of the parts can occur because of the very heavy tension of the secondary spring 41 exerted at this time and the small leverage exerted by the rock lever 27 and link 30 upon the rear pivot 31 of the main spring 32.

To simplify the description of the present invention and the character of the appended claims, it is assumed that the three pivot centers 28, 31 and the fulcrum of the rock levers 27 may lie in a perfectly straight line inasmuch as it is a more or less close approach to this position which determines the extent to which the effective lever arm of the secondary spring 41 is cut down. In actual practice, however, an absolutely straight line relationship is seldom exactly reached.

The total effective lever arm of the secondary spring 41 relatively to the pivot center 31 depends primarily on the relative positions of the rock arms 27 and the links 30,— the concomitant decrease in the effective leverage of the rock arm 36 being more than offset thereby. The relationship between said total effective lever arm or the actual resilient resistance of the secondary spring 41 to upward movement of pivot 31 is not a straight line relationship, but is approximately sinusoidal, by reason of the character of the construction. This means that when the parts are in the position of Fig. 4, a relatively slight increase in upward pressure of the axle 35 causes a very considerable elevation of pivot 31 and hence also of the main spring 32 and of the axle 35 itself. Further increments of pressure however cause constantly decreasing elevations of said pivot 31. This relationship may be aptly expressed by saying that the main spring 32 is "non-bottoming" in that the total effective lever arm of the secondary spring opposing its upward movement decreases sinusoidally and seldom actually becomes zero, i. e., seldom arrives at an exactly dead center position. Furthermore, even when it does so, no harshness of action results, because, before this condition is finally reached, the vertical movement component of the pivot 31 has already been gradually reduced to such a small amount that the further reduction to absolute zero is negligible in amount. In actual practice no such fine distinctions are necessary because the strength of the secondary spring is sufficient to usually prevent such a straight line relationship and to prevent any locking in place even if the parts go past dead center. It is to be understood of course that as the different parts move from the normal loaded position of Fig. 4 and approach the position of Fig. 3, not only is the total effective lever arm of the secondary spring 41 very materially reduced but, in addition, the actual tension of the spring itself very considerably increased, due to its being stretched by the partial rotation of the rock arm 36. It is to be also understood that, as the rock levers 27 and links 30 approach the position of Fig. 3, the rate of movement of said levers and links rapidly decreases until said levers and links gradually become practically stationary with respect to the chassis frame. Furthermore, while this process is going on, the main spring 32 is being subjected to ever-increasing amounts of pressure until finally any greater upward pressures of the axle 35 than that indicated in Fig. 3, are carried practically entirely by said main spring 32. It should be noticed moreover, (as to the parts associated with the secondary spring 41 and their transference of movement to the main spring 32) that this does not involve a sudden transference of movement but is also sinusoidal in nature. In other words the slowing down of the pivot 31 is sinusoidal and the loading of the main spring is also sinusoidal.

As a verification of the foregoing more or less theoretical analysis, a heavy truck equipped with the present invention and properly adjusted to carry a heavy load without any "bottoming" of the secondary springs was driven without any useful load at high speed over a very rough road. Despite these conditions it was found as an actual fact that articles placed on the floor of said truck directly over the rear axle thereof did not leave the floor of the truck. When the truck was fully loaded, the riding qualities were, of course, still smoother and did not require any adjustment of any kind to adapt the same for this heavy load,—this being due to the fact that while the static position of the lever 27 and link 30 is somewhat different for heavy loads as compared with light or no loads, nevertheless in all cases the secondary spring was able to function effectively in absorbing all of the small but rapid up and down movements of the axle 35. Furthermore, the total possible range of movement of said lever 27 and link 30 is constant, irrespective of whether the vehicle is fully loaded or is not loaded at all (see Figs. 3–6).

Figure 5:
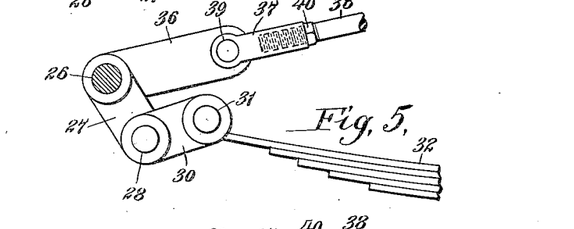
Figure 6:
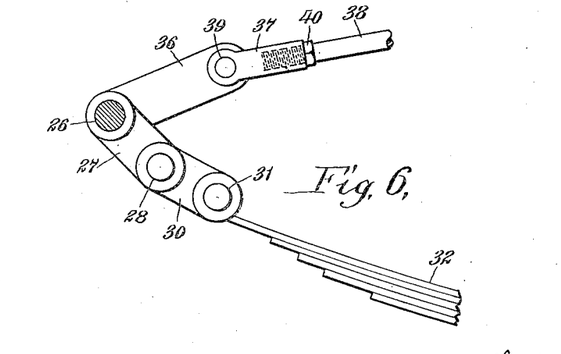

When the vehicle goes over a depression, the axle 35 drops. The first stage of such a downward movement of the axle is illustrated respectively by Figs. 4 and 5. In Fig. 5 the secondary spring 41 is exerting a tension along a line passing through the pivot 39 and the axis of the rock shaft 26. This means that, in this position, said secondary spring 41 is totally ineffective and has ceased to "oppose" the main spring 32 as per Figs. 3 and 4. If, however, the axle drops below the position of Fig. 5 to the position of Fig. 6 for instance, then said secondary spring becomes again increasingly effective. This effectiveness is exerted in again "opposing" the main spring but in this case as to the downward movement thereof. The secondary spring therefore acts in the capacity of a shock absorber to absorb some of the potential energy inherent in the main spring 32, axle 35 etc. when all of the latter are allowed to move rapidly downward relatively to the main frame of the vehicle chassis. This downward movement of the pivot 31 is resisted sinusoidally, just as, in Fig. 3, the upward movement of said pivot 31 is resisted sinusoidally. Concomitantly, all of the arguments regarding the advantages of this sinusoidal movement apply to this position of Fig. 6 just as they apply to the position of Fig. 3. One of the many practical advantages of this sinusoidal and shock absorber effect in the present invention is that the stored up resilience of the main spring 32 is so gradually absorbed (as the various parts move through the successive positions of 3, 4, 5 and 6) that no spring clips on the main spring are usually necessary; the main leaf of the main spring 32 is usually sufficiently strong to sustain the static unsprung weight of axle and wheels and the weight of the lower leaves of said main spring and is not called upon to sustain any pressures considerably greater than these.

One of the notable advantages of the present invention is the large possible amount of vertical movement of the pivot 31 and hence of the axle 35. By an inspection of Figs. 3 and 6 it will be noted that the total vertical freedom of movement of this pivot 31 is approximately equal to twice the distance between the pivot centers 31 and 28, plus twice the distance from said pivot center 28 to the axis of the rock shaft 26, the latter being the fulcrum of the rock lever 27. This permits a very considerable and desirable vertical movement of the vehicle axle. If, however, an even greater amount of vertical movement should be desired, it is obvious that both ends of the main spring 32 may be equipped with rock levers 27, links 30 and secondary springs 41. In such a case it would, of course, be necessary to employ a radius rod or some other means of taking care of the horizontal force components to which the axle 35 is subjected. Such an arrangement is well known in the art and need not be further discussed here. When the spring and shock absorber suspension is organized as for instance in Figs. 1–6, the fixed main spring pivot 33 is preferably disposed at the front end of said main spring so that when the vehicle moves forwardly over an obstruction, the movement of the axle 35 is upward and rearward about said fixed pivot 33 as an approximate center of rotation. Such an upward and backward axle movement reduces the vertical component and acceleration and thereby increases the riding qualities of the spring suspension.

When a vehicle is moving and is steered horizontally to either the right or the left, the momentum of the body tends to cause the springs on the "outer" side of the vehicle to receive an increase of load, due to the lateral component of said momentum, while the springs on the "inner" side of the vehicle tend to be relieved of an equal amount of load. This causes what is commonly known as side sway. Such a side sway is almost entirely eliminated in the present invention. This is due to the fact that both of the rock levers 27 are secured to the one common rock shaft 26. The action of this arrangement is as follows:

When a tendency to side sway occurs, the "outer" end of the axle 35 moves upwardly with respect to the adjacent side frame and tends to compress the adjacent or "outer" main spring 32. Before however any material flexing of this "outer" main spring can take place, the pressure exerted upwardly on the companion "outer" spring pivot 31 causes a partial rotation of the rock shaft 26, corresponding for instance to a change in position represented by Figs. 4 and 3. Said rock shaft 26 (extending laterally as it does across the vehicle chassis and connected to both the "outer" and the "inner" spring suspensions) transfers this movement to the spring and shock absorber suspension on the "inner" side of the vehicle. Said movement is not however transferred directly to the adjacent end of the axle 35, inasmuch as such a construction would involve terrific strains on the working parts. Instead, this partial rotary movement of said rock shaft 26 merely operates to lift the pivot 31 of the "inner" main spring 32. This relieves the pressure of said "inner" main spring and allows the "inner" side of the vehicle to drop an amount equal to the amount of drop which occurs on the outer side of the vehicle. In other words, when a vehicle is equipped with the present invention and, while moving, is steered to the right or to the left, no side sway occurs, because, instead of each of the springs bearing an equal amount of load as occurs when travelling straight ahead the present invention provides that this increased load will be given to the "outer" main springs and a corresponding amount subtracted from the inner main springs, during which transference the body simply moves a short distance downwardly to permit of this extra loading of the springs on the "outer" side, but without any tendency to tip sidewise, i. e., to side sway. To put the matter in another fashion, when a tendency to side sway occurs in a vehicle equipped with the present invention, the "outer" side of the vehicle is allowed to move down toward the axle to allow a greater pressure to be carried on the "outer" spring suspension but at the same time the "inner" side of the vehicle is allowed to move down an equal distance, and thereby side sway translated into pure vertical movement. It should be noted that this tendency to side sway, when the vehicle is turning, causes (in a vehicle equipped with the present invention) a lowering of the vehicle body toward the roadbed. This results in a lowering of the center of gravity of the entire vehicle, and at the precise time when a lower center of gravity is most necessary, i. e., when the vehicle is turning to the right or left and is most likely to roll over. Furthermore, when any such tendency to side sway does exist, the small translatory vertical movement which does take place is of a sinusoidal nature and is usually effected without any appreciable flexure of the main springs whatsoever, the sinusoidal flexure of the secondary springs being ordinarily quite sufficient to cushion said small vertical movement. Even if said secondary spring be unable to sustain all of said added vertical movement, no harsh or sudden change in spring action can result because of the involved factors previously described relative to the sinusoidal load absorbing qualities of the main springs 32.

Figures 7, 8:
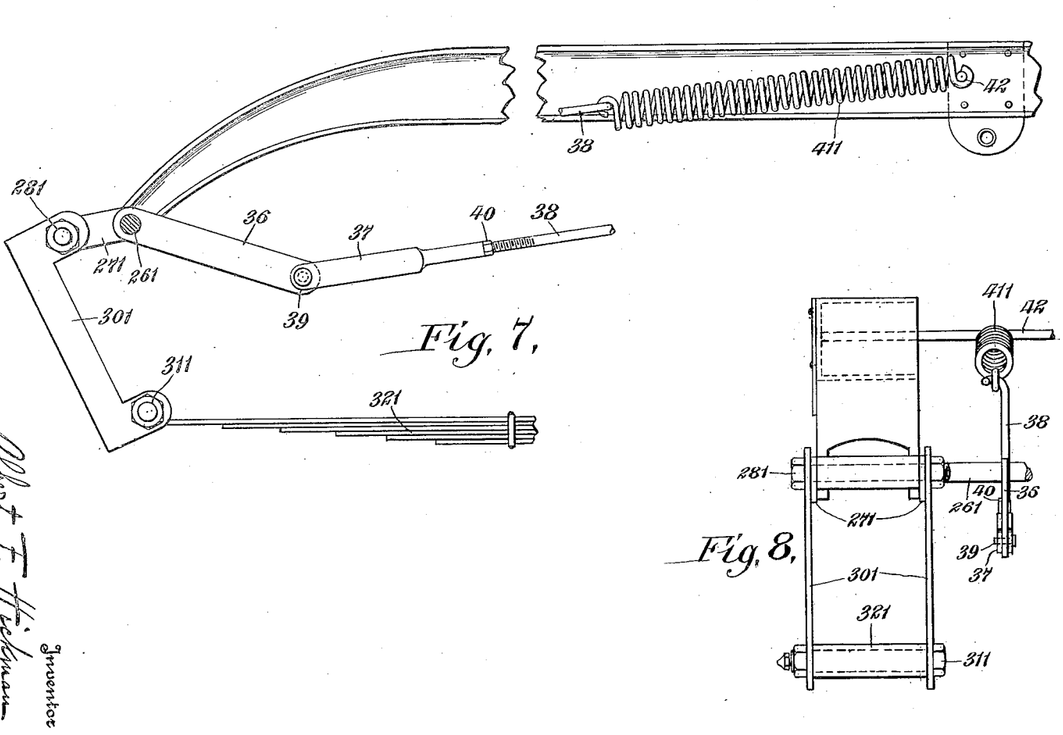
Figure 7 is a fragmentary side elevation of a modified form of the invention applied to the rear axle of a vehicle and showing an inclined secondary spring.
Figure 8 is a fragmentary, rear elevation of the same.

In Figs. 7 and 8 is shown a modified form of the invention also applied to a rear spring and shock absorber suspension, the particular arrangement shown being rendered necessary by reason of the construction of the particular vehicle to which it is adapted to be attached. Here also, as in the construction of Figs. 1–6, the pivot centers 311 and 281 of the link 301 are able to lie in the same straight line with the fulcrum of the rock lever 271 i. e., with the axis of the rock shaft 261. Furthermore, this straight line relationship can occur either when said pivot 281 is above or below said rock shaft 261. It will be noticed that when the link 301 is in its extreme upper position, its pivots 281 and 311 straddle said rock shaft 261 and this accounts for the U shaped form of said link 301, which in no way detracts from the sinusoidal or "nonbottoming" effect of the spring suspension. In this construction, as before, the rock shaft 261 extends clear across the vehicle and is connected with a similar spring suspension on the other side of said vehicle, thereby eliminating side sway in the manner previously described.

This construction of Figs. 7 and 8 (and also Figs. 9 and 10) has one notable feature. In this particular case the construction permits of using an inclined secondary spring 411. Such an inclined and hence partially vertical secondary spring arrangement has the following advantage:—When the vehicle axle moves upwardly, the main spring also receives an upward pressure, which is transferred more or less to the main frame of the vehicle chassis and hence of course also to the vehicle body. In other words, there is a vertical, upwardly directed force imposed upon the vehicle body by the main spring 321. In this construction of Figs. 7 and 8, said upward vertical thrust is partially counterbalanced by the vertical, downward component of said inclined secondary spring 411. It is obvious therefore that, wherever the secondary spring 411 can be arranged more or less vertically, the riding qualities of the vehicle as a whole are materially increased. It is furthermore obvious that, where the construction of the vehicle permits, this secondary spring 411 is preferably not merely inclined somewhat but is arranged on an axis which is exactly vertical.

Figure 9:
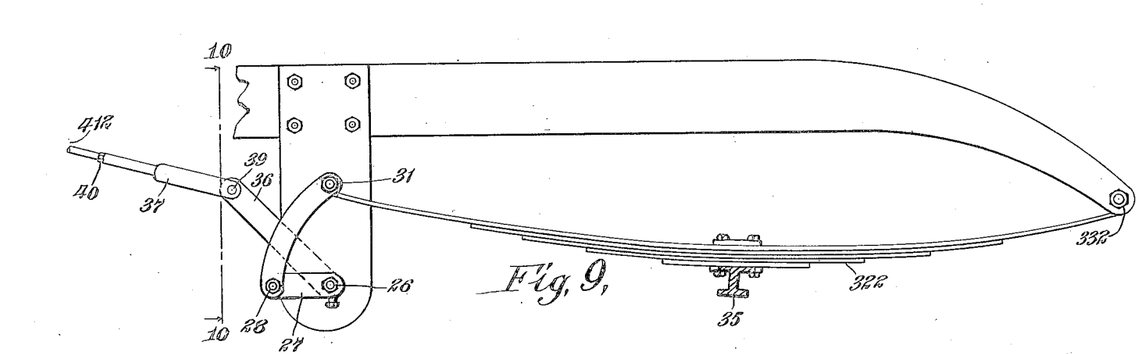
Figure 9 is a side elevation of another modified form of spring and shock absorber used with the front axle of a vehicle.
Figure 10:
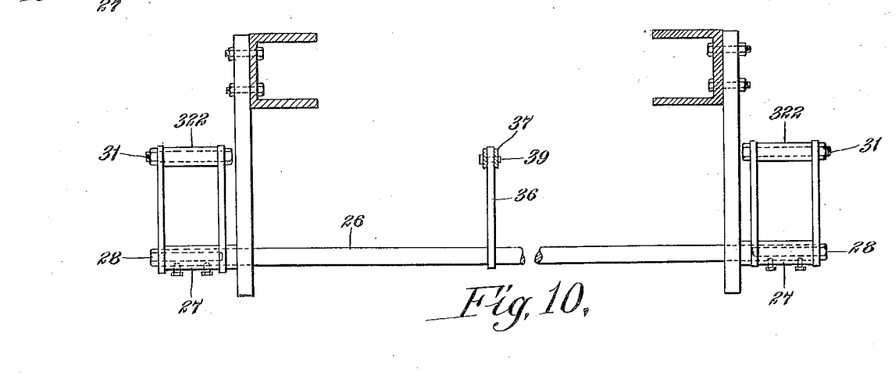
Figure 10 is a fragmentary, vertical, transverse section thereof taken on line 10—10, Fig. 9.

Figs. 9 and 10 show another modification of the invention. In this case also the front main spring 322 is pivoted at its front end to the main chassis frame upon the fixed pivot 332, this being the preferred arrangement whenever the construction of the vehicle permits of its use. The secondary spring is also inclined as in Figs. 7 and 8 but is not disposed adjacent the main spring 322, extending instead rearwardly and upwardly toward the center of gravity of the vehicle so that a smaller vehicle movement is caused by changes in flexure of the secondary spring 412.

Although I have shown and described my invention in considerable detail, I do not wish to be limited to the exact and specific details shown and described herein, but contemplate such substitutions, modifications or equivalents thereof as are embraced within the scope of my invention or are pointed out in the following claims.

I claim as my invention:

1. A vehicle spring suspension associated with the frame and wheel of a vehicle and comprising a rock lever journaled on said frame and having a crank pin which is so connected with said vehicle wheel that the line of pressure derived from said wheel and directed against said crank pin is able to pass through the axis of said crank arm; and means for resiliently restraining rotation of said rock lever.

2. A vehicle spring suspension associated with the frame and axle of a vehicle and comprising a main movable member connected with said axle; a rock lever having a crank pivot which is pivotally connected with said main movable member, said rock lever being journaled on the vehicle frame at such a point that the line of the force imposed by the main movable member upon its crank pivot is able to pass through the axis of the rock lever and also through the axis of the crank pivot; and means for resiliently restraining rotation of said rock lever about its axis.

3. A vehicle spring suspension associated with the frame and axle of a vehicle and comprising a pair of main movable members connected to opposite ends of said axle; a rock shaft journaled transversely on said vehicle frame; a rock lever arranged at each end of said rock shaft and having a crank pivot which is so pivotally connected to one of said main movable members that the line of force imposed by each of said main movable members upon its companion crank pivot is able to lie in a straight line passing through both the axis of said rock shaft and the axis of said crank pivot; and means for resiliently restraining rotation of said rock shaft.

4. A vehicle spring suspension associated with the frame and wheels of a vehicle and comprising a rock shaft journaled transversely on said frame; a rock lever arranged at each end of said rock shaft and having a crank pin which is so connected with one of said vehicle wheels that the line of pressure derived from said wheel and directed against said crank pin is able to pass through the axis of said crank arm; and means for resiliently restraining rotation of said rock shaft.

5. A vehicle spring suspension associated with the frame and wheel of a vehicle and comprising a rock lever journaled on said frame and having a crank pin which is resiliently connected to said vehicle wheel in such manner that the line of pressure imposed by said wheel against said crank pin is able to pass through the axis of said rock lever; and means for resiliently restraining rotation of the rock lever.

6. A vehicle spring suspension associated with the frame and wheel of a vehicle and comprising a main spring connected at one point with said wheel; a rock lever journaled on said frame and having a crank pin which is so connected with another point of main spring that the pressure imposed by said main spring against said crank pin is able to pass through the axis of said rock lever; and means for resiliently restraining rotation of the rock lever.

7. A vehicle spring suspension associated with the frame and wheel of a vehicle and comprising a rock lever journaled on said frame and having a crank pin which is resiliently connected to said vehicle wheel in such manner that the line of pressure imposed by said wheel against said crank pin is able to pass through the axis of said rock lever; a resilient connection between said wheel and said frame in addition to that through the crank pin; and means for resiliently restraining rotation of the rock lever.

8. A vehicle spring suspension associated with the frame and wheel of a vehicle and comprising a rock lever journaled on said frame and having a crank pin which is resiliently connected to said vehicle wheel in such manner that the line of pressure imposed by said wheel against said crank pin is able to pass through the axis of said rock lever both when said pressure is exerted upwardly and also when exerted downwardly; and means for resiliently restraining rotation of the rock lever.

9. A vehicle spring suspension associated with the frame and wheel of a vehicle and comprising a main spring connected at one point with said wheel; a rock lever journaled on said frame and having a crank pin which is so connected with another point of main spring that the pressure imposed by said main spring against said crank pin is able to pass through the axis of said rock lever both when said pressure is exerted upwardly and also when exerted downwardly; and means for resiliently restraining rotation of the rock lever.

10. A vehicle spring suspension associated with the frame and wheels of a vehicle and comprising a rock shaft journaled in said frame and provided at each end with a rock lever having a crank pin which is resiliently connected to one of said vehicle wheels in such manner that the line of pressure imposed by said wheel against said crank pin is able to pass through the axis of said rock lever; and means for resiliently restraining rotation of the rock lever.

11. A vehicle spring suspension associated with the frame and wheels of a vehicle and comprising main springs each connected at one point with one of said wheels; a rock shaft journaled on said frame and provided at each end with a rock lever having a crank pin which is so connected with another point of its companion main spring that the pressure imposed by each main spring upon its companion crank pin is able to pass through the axis of said rock lever; and means for resiliently restraining rotation of the rock shaft.

12. A vehicle spring suspension associated with the frame and wheels of a vehicle and comprising a rock shaft journaled in said frame and provided at each end with a rock lever having a crank pin which is resiliently connected to one of said vehicle wheels in such manner that the line of pressure imposed by said wheel against said crank pin is able to pass through the axis of said rock lever both when said pressure is exerted upwardly and also when exerted downwardly; and means for resiliently restraining rotation of the rock lever.

13. A vehicle spring suspension associated with the frame and wheels of a vehicle and comprising main springs each connected at one point with one of said wheels; a rock shaft journaled on said frame and provided at each end with a rock lever having a crank pin which is so connected with another point of its companion main spring that the pressure imposed by each main spring upon its companion crank pin is able to pass through the axis of said rock lever both when said pressure is exerted upwardly and also when exerted downwardly; and means for resiliently restraining rotation of the rock shaft.

14. A vehicle spring suspension associated with the frame and axle of a vehicle and comprising a main spring connected with said axle; a link pivotally connected at one of its ends to said spring; a lever pivotally connected to the other end of said link and journaled on the vehicle frame at such a point that the pivotal centers of said link are able to lie in the same straight line with the axis of said lever; and means for resiliently restraining rotation of said lever about its axis.

15. A vehicle spring suspension associated with the frame and axle of a vehicle and comprising a main spring connected intermediately of its ends to said axle and pivotally connected at one of its ends to said vehicle frame; a link pivoted at one of its ends to the other end of said spring; a lever pivoted to the other end of said link and journaled on the vehicle frame at such a point that the pivot centers of said link are able to lie in the same straight line with the axis of said lever; and means for resiliently restraining rotation of said lever about its axis.

16. A vehicle spring suspension associated with the frame of a vehicle and comprising a pair of vehicle springs; a rock shaft journaled transversely in said vehicle frame; levers secured to said rock shaft; a link pivotally connected at one end to each of said levers and pivotally connected at its other end to one part of one of said vehicle springs; an axle provided with ground wheels and connected at its opposite ends to said springs remotely from said links; and means for resiliently restraining rotation of said rock shaft.

17. A vehicle spring suspension associated with the frame and axle of a vehicle and comprising a pair of vehicle springs; a rock shaft journaled transversely in said vehicle frame; levers secured to said rock shaft; a link pivotally connected at one end to each of said vehicle springs and pivotally connected at its other end to each of said levers in such manner as to be capable of having its pivot centers lie in the same straight plane with the axis of said rock shaft; and means for resiliently restraining rotation of said rock shaft.

18. A vehicle spring suspension associated with the frame and axis of a vehicle and comprising a pair of vehicle springs; a rock shaft journaled transversely in said vehicle frame; levers secured to said rock shaft; a link pivotally connected at one end to each of said vehicle springs and pivotally connected at its other end to each of said levers in such manner as to be capable of having its pivot centers lie in the same straight plane with the axis of said rock shaft; a rock arm secured to said rock shaft; and a secondary spring connected with said rock arm.

19. A vehicle spring suspension associated with the frame and axle of a vehicle and comprising a pair of vehicle springs; a rock shaft journaled transversely in said vehicle frame; levers secured to said rock shaft; a link pivotally connected at one end to each of said vehicle springs and pivotally connected at its other end to each of said levers in such manner as to be capable of having its pivot centers lie in the same straight plane with the axis of said rock shaft; a rock arm secured to said rock shaft; and a secondary spring connected at one end to said rock arm and connected at its other end to the vehicle frame.

20. A vehicle spring suspension associated with the frame and axle of a vehicle and comprising a pair of vehicle springs; a rock shaft journaled transversely in said vehicle frame; levers secured to said rock shaft; a link pivotally connected at one end to each of said vehicle springs and pivotally connected at its other end to each of said levers in such manner as to be capable of having its pivot centers lie in the same straight plane with the axis of said rock shaft; a rock arm secured to said rock shaft; and a longitudinal secondary spring connected at one end to said rock arm and connected at its other end to the vehicle frame.

21. A vehicle spring suspension associated with the frame and axle of a vehicle and comprising a main spring connected with said axle; a link pivotally connected at one of its ends to said spring; a lever pivotally connected with the other end of said link and journaled on the vehicle frame at such a point that the pivotal centers of said link are able to lie in the same straight line with the axis of said lever in two different positions corresponding to the extreme upward and downward flexures of the main spring relatively to the vehicle frame; and means for resiliently restraining rotation of said lever about its axis.

22. A vehicle spring suspension associated with the frame and axle of a vehicle and comprising a main spring connected with said axle; a link pivotally connected at one of its ends to said spring; a lever pivotally connected with the other end of said link and journaled on the vehicle frame at such a point that the pivotal centers of said link are able to lie in the same straight line with the axis of said lever in two different positions corresponding to the extreme upward and downward flexures of the main spring relatively to the vehicle frame; and means for resiliently restraining rotation of said lever toward both of its limiting positions.

23. A vehicle spring suspension associated with the frame and axle of a vehicle and comprising a main spring connected with said axle; a link pivotally connected at one of its ends to said spring; a lever pivotally connected with the other end of said link and journaled on the vehicle frame at such a point that the pivotal centers of said link are able to lie in the same straight line with the axis of said lever in two different positions corresponding to the extreme upward and downward flexures of the main spring relatively to the vehicle frame; a rock arm connected with said lever; and a single secondary spring connected to said rock arm and operating to resiliently resist rotation thereof toward both of the limiting positions.

24. A vehicle spring suspension associated with the frame and axle of a vehicle and comprising a main spring connected with said axle; a link pivotally connected at one of its ends to said spring; a lever pivotally connected to the other end of said link and journaled on said vehicle frame and adapted to swing through approximately 180 degrees; and means for resiliently restraining rotation of said lever.

25. A vehicle spring suspension associated with the frame and axle of a vehicle and comprising a main spring connected with said axle; a link pivotally connected at one of its ends to said spring; a lever pivotally connected to the other end of said link and journaled on said vehicle frame and adapted to swing through approximately 180 degrees; and means for resiliently restraining rotation of said lever toward both of its opposite positions.

26. A vehicle spring suspension associated with the frame and axle of a vehicle and comprising a main spring connected with said axle; a link pivotally connected at one of its ends to said spring; a lever pivotally connected to the other end of said link and fulcrumed on the vehicle frame in such manner that when the main spring is flexed to its extreme position in the one direction, the pivotal centers of said link lie above said lever and in a plane which is approximately vertical and passes through the fulcrum of said lever, whereas, when said main spring is flexed to its extreme position in the opposite direction, the pivotal centers of said link lie below said lever but likewise in a plane which is approximately vertical and passes through the fulcrum of said lever; and means for resiliently restraining rotation of said lever.

27. A vehicle spring suspension associated with the frame and axle of a vehicle and comprising a main spring connected with said axle; a link pivotally connected at one of its ends to said spring; a lever pivotally connected to the other end of said link and fulcrumed on the vehicle frame in such manner that, when the main spring is flexed to its extreme position in the one direction, the pivotal centers of said link lie above said lever and in a plane which is approximately vertical and passes through the fulcrum of said lever, whereas, when said main spring is flexed to its extreme position in the opposite direction, the pivotal centers of said link lie below said lever but likewise in a plane which is approximately vertical and passes through the fulcrum of said lever; and means for resiliently restraining rotation of said lever toward both of its extreme positions.

28. A vehicle spring suspension associated with the frame and axle of a vehicle and comprising a rock shaft journaled transversely in said vehicle frame; a pair of forwardly extending, symmetrically arranged levers secured to said rock shaft and adapted to move through an arc of approximately 180 degrees; links secured at their one ends to said levers and arranged to have their pivot centers lie in the same straight plane as the axis of said rock shaft when said levers are in their extreme upper and lower positions; main vehicle springs pivoted at their rear ends to the other ends of said links and pivoted at their front ends to the vehicle frame; a rock arm secured to said rock shaft; a secondary spring secured at its one end to the vehicle frame and secured at its other end to said rock arm and extending longitudinally and upwardly therefrom and so disposed that it offers resilient resistance to the movement of said levers toward both of their extreme positions; means for adjusting the tension on said secondary spring; and a transverse axle secured to said main vehicle springs intermediate of their length.

In testimony whereof I hereby affix my signature.

ALBERT F. HICKMAN.